TELEPHONE TEST SET

Filed March 1, 1961

INVENTORS
D. L. DONVILLE
W. B. LUEFT
P. S. PHILIPPI
By A J Nugent
ATTORNEY

TELEPHONE TEST SET

INVENTORS
D.L.DONVILLE
W.B.LUEFT
P.S.PHILIPPI
By A.J. Nugent
ATTORNEY

TELEPHONE TEST SET

Filed March 1, 1961 4 Sheets-Sheet 3

INVENTORS
D. L. DONVILLE
W. B. LUEFT
P. S. PHILIPPI
By A. J. Nugent
ATTORNEY

March 3, 1964 D. L. DONVILLE ETAL 3,123,679

TELEPHONE TEST SET

Filed March 1, 1961 4 Sheets-Sheet 4

INVENTORS
D. L. DONVILLE
W. B. LUEFT
P. S. PHILIPPI
BY A. J. Nugent
ATTORNEY

United States Patent Office 3,123,679
Patented Mar. 3, 1964

3,123,679

TELEPHONE TEST SET

David L. Donville, Wayne, N.J., Walter B. Lueft, North Merrick, N.Y., and Peter S. Philippi, Freehold, N.J., assignors to Western Electric Company, Incorporated, New York, N.Y., a corporation of New York Filed Mar. 1, 1961, Ser. No. 92,541
6 Claims. (Cl. 179—175.2)

This invention relates to testing telephone sets and particularly to automatically testing the dial speed and the ratio of the make-to-break portions of the dial pulses.

In testing of telephone sets, it is desirable to perform in sequence rapid and reliable automatic tests of various telephone test set characteristics. Of prime importance is the assurance that the dial speed and the ratio of make-to-break of the dial pulses are within precisely defined limits, in order to make certain that the pulses will be able to operate properly the automatic equipment at a telephone exchange.

One object of the invention is a telephone test set which is capable of making automatic rapid and reliable tests of dial pulses.

Another object of the invention is a telephone test set for making tests of dial speed.

A further object of the invention is a telephone test set for making tests of the ratio of the make-to-break portions of dial pulses.

An important aspect of the invention is the simultaneous testing of dial speed and the percent break of pulses using quick-acting electronic devices providing accurate test results.

Further features of the invention are, respectively, a relay driver gate circuit for controlling the operation of the testing circuit, and a percent break charging circuit.

In one embodiment of the invention, the dial pulse of the telephone set under test are fed to a counter which operates a control means to enable a voltage comparison circuit to determine the charge accumulated on a capacitor during a predetermined time interval, the results of the comparison being immediately recorded by an indicator.

In making a test of the dial speed, the dial pulses are amplified and regenerated to remove distortion and then applied to a counter tube. The first pulse is reproduced by the counter tube to operate a relay control circuit to begin the test. At this time, a reference capacitor in a comparison circuit determining the allowable maximum speed is charged to a fixed voltage and another capacitor in series opposing relationship thereto continues to charge until the relay control circuit is operated on receipt of the last pulse from the counter tube to terminate the testing interval. If, on termination of the testing interval, the difference voltage across the capacitors is above a predetermined amount, it causes operation of an amplifier and a thyratron trigger circuit indicating that the dial speed is fast. Simultaneously with the operation of the comparison circuit just described, a second comparison circuit is placed in operation to determine whether the dial speed is slow. If the dial speed is too fast, a "fast" indication is recorded. Conversely, if the dial speed is too slow, a "slow" indication is recorded. If the dial speed is within limits, neither too fast nor too slow, a "good" indication will be recorded, demonstrating that the dial has passed the test.

The dial pulses of the telephone set under test are also fed to an electronic break charging circuit to make a test of the ratio of make-to-break. Voltage comparison circuits similar to those mentioned above are used in the ratio test, one for a percent break which is too high, and the other for a percent break which is too low, appropriate indications, "high" and "low," being given when such conditions are encountered. When the percent break is neither too high nor too low, a "good" indication is given. The indicators for the dial speed and percent break tests preferably comprises a series of test lamps.

The invention may be more completely understood from the following detailed description and the drawings, wherein.

Figure 1:
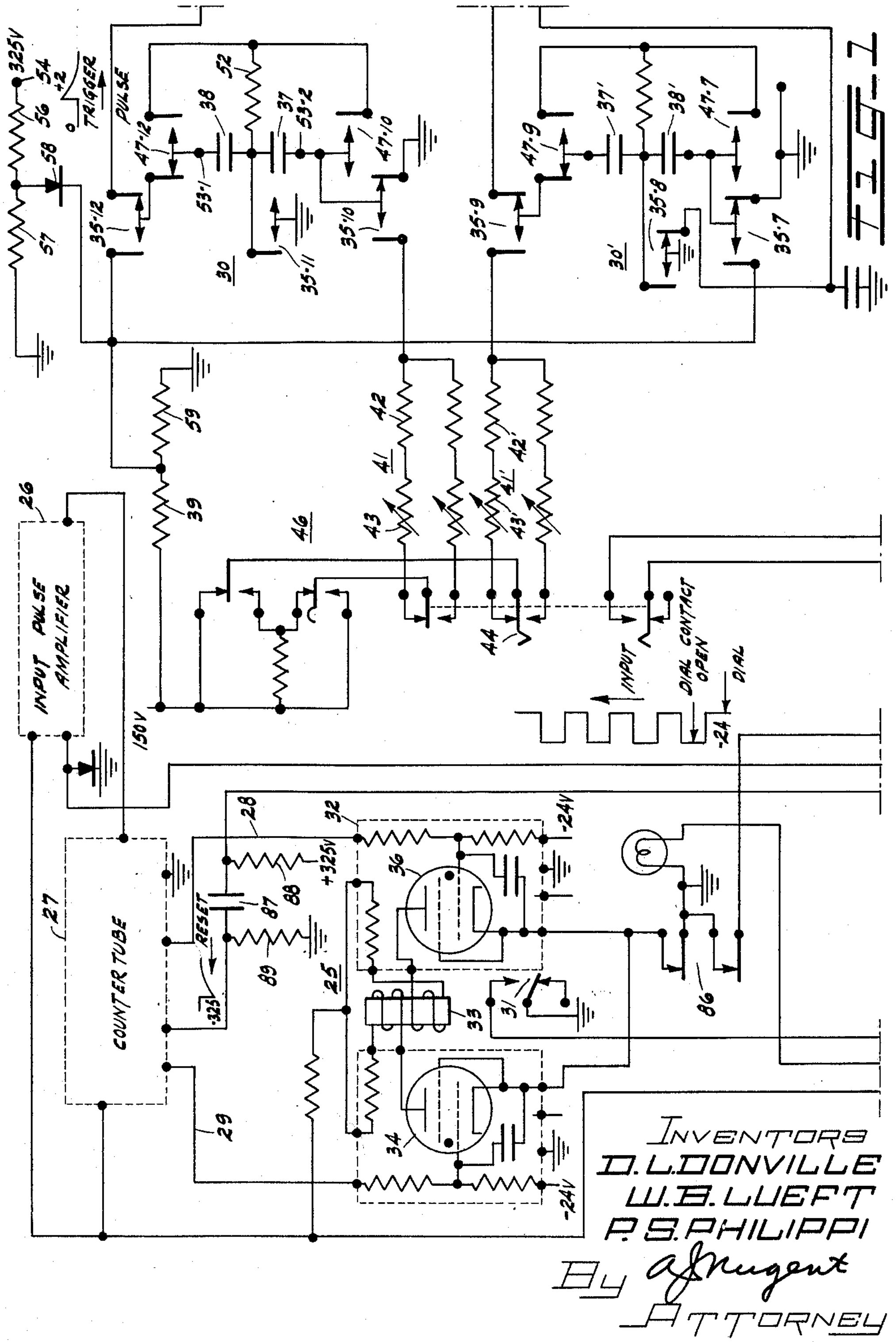
FIG. 1 shows the input amplifier, pulse counter relay driver, dial speed calibrator and dial speed voltage comparison circuits.
Figure 2:
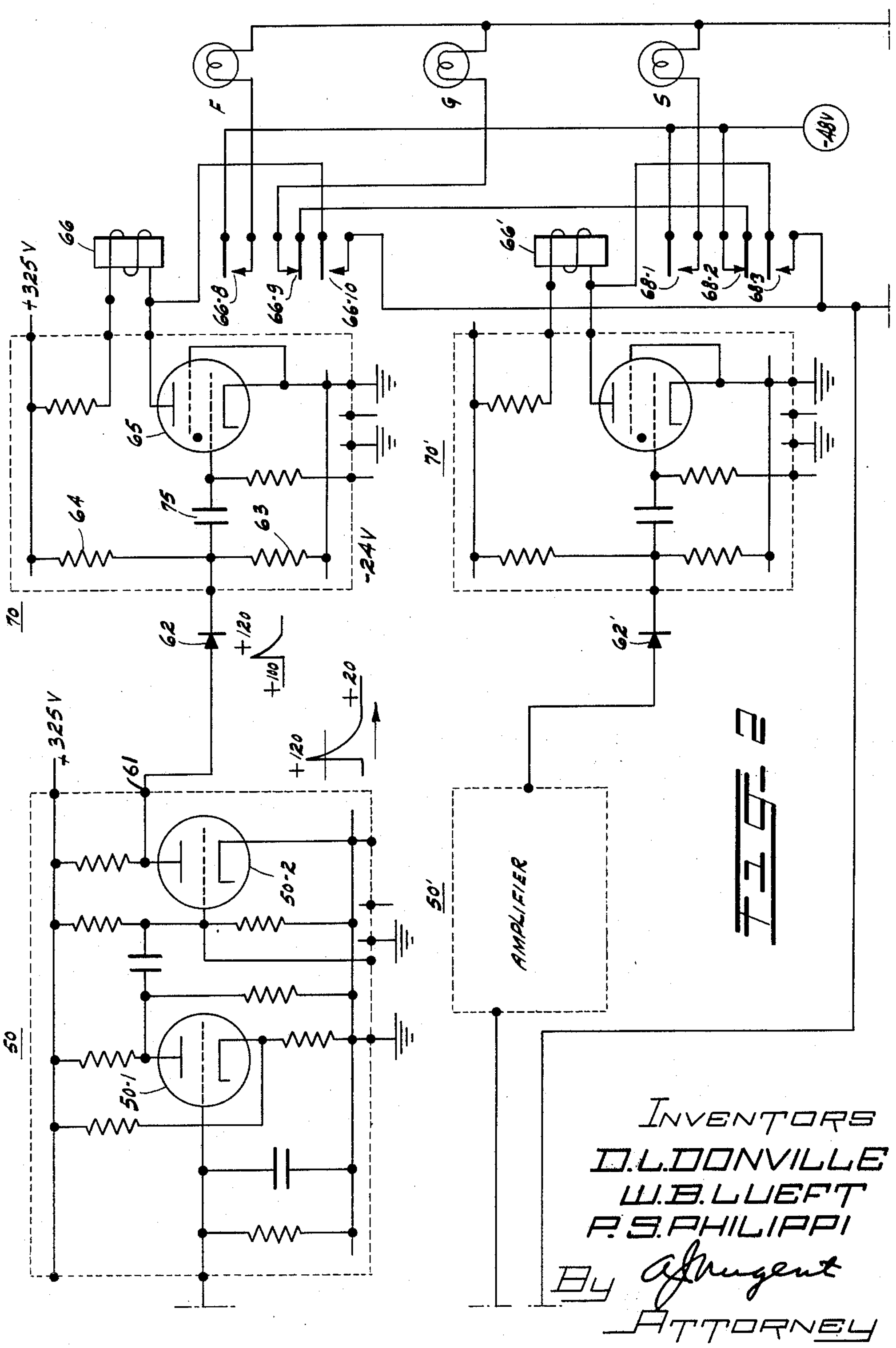
FIG. 2 shows the dial speed amplifier, thyratron trigger, and lamp circuits used in testing the dial speed.
Figure 3:
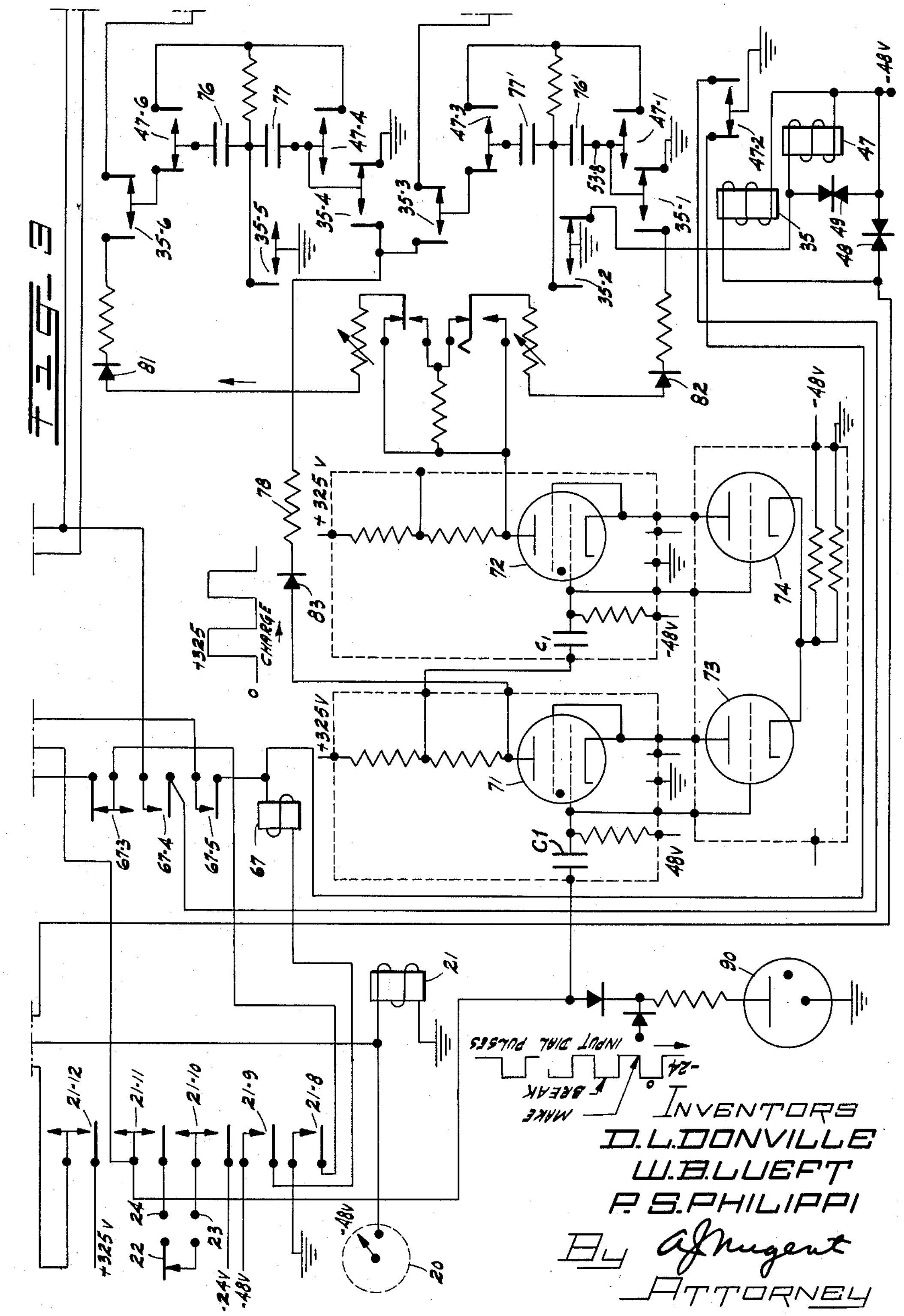
FIG. 3 shows the percent break charging circuit, percent break calibrator and percent break voltage comparison circuits.
Figures 4, 5:
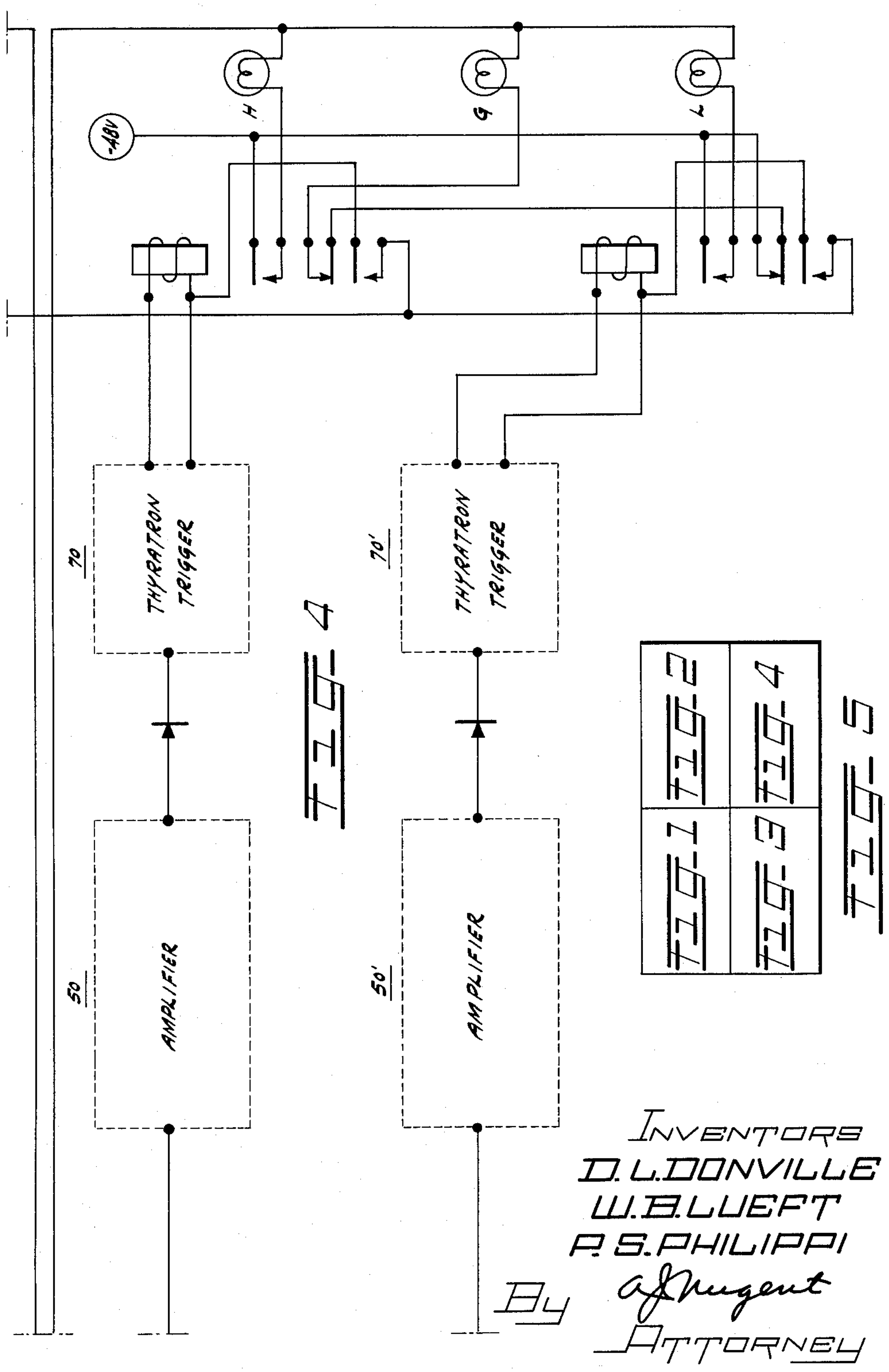
FIG. 4 shows the amplifier, thyratron, and lamp circuits used in testing the percent break; and FIG, 5 shows how the complete circuit is established by combining FIGS. 1 to 4 inclusive.

It will be assumed that a selector switch 20 has been stepped to a position whereat the relay 21 is operated. This places the telephone dial 22 in a circuit extending through contact 10 of relay pulsing contact 21, terminal 23, dial contact 22, terminal 24, contact 11 of relay 21, to an input pulse amplifier 26. This amplifier is provided in order to regenerate the dial pulses. The dial pulses become distorted, particularly when a bridge ringing type telephone is being tested, and cause erratic operation of the testing circuit if they are not reformed. From the output of the input pulse amplifier 26, the regenerated dial pulses are fed to a counter tube 27 which may be a Western Electric 439A type ten-stage, cold-cathode gas-discharge stepping tube. A tube of this type is described in the article "A Ten-Stage Cold-Cathode Stepping Tube" by D. S. Beck, Electrical Engineering, pages 1136 to 1139, December 1952. This tube reproduces the first pulse on lead 28, and the tenth or last pulse on lead 29. The counting tube is of the type that steps a glow discharge along a series of cathodes in response to the receipt of input pulses. The first and tenth dial pulses are thus fed to a relay driver dial speed gate circuit 25 which will now be described.

The relay driver dial speed gate circuit is composed of units 31 and 32, which are identical, and polarized relay 33. Each unit includes a thyratron 34, 36, preferably a 5696 type, which is normally off because of the —24 v. D.C. grid bias, and the relay swinger 31 is in the position shown. Relay 33 is magnetically biased so that with no power on, the swinger 31 is attracted to the lower contact, which is considered its normal position. The positive output dial pulse on lead 28 received from the counter on the first break is fed to the grid of thyratron 36 and overcomes the negative grid bias. This allows that thyratron to conduct (fires it), which operates relay 33. At the tenth break, a positive pulse on lead 29 is fed to the grid of thyratron 34 to fire that thyratron and restore relay 33 to its normal position.

The initial surge of tube current through thyratron 34 and the upper relay winding induces, because of the relay winding transformer action, a large negative pulse in the lower relay winding connected in the plate circuit of thyratron 36. This negative pulse momentarily drives the thyratron 36 plate negative and the thyratron deionizes (shuts off), because the plate-cathode voltage is insufficient to sustain conduction. If the dial is operated again, thyratron 36 will conduct on the first break and in a similar manner to that described above shuts off thyratron 34.

The dial speed is checked by comparing the voltage across two capacitors 37, 38 or 37′, 38′ of a voltage comparison circuit 30, 30′. Voltage comparison circuit 30 is for the maximum speed test (upper limit) and voltage comparison circuit 30′ is for the minimum speed test (lower limit). A 150 v. D.C. supply is used to charge the capacitors through a set of series resistors. Capacitor 38 is a reference capacitor which always charges alike through the fixed resistor 39. Capacitor 38 is charged from resistor 39 through contact 12 of relay 35, contact 12 of relay 47, and contact 11 of relay 35, to ground while capacitor 38′ is charged through contacts 7 and 8 of relay 35 to ground. References to the relay contacts have been hyphenated in the drawings for convenience. Capacitors 37, 37′ are charged respectively through the dial speed calibration resistors 41, 41′ consisting of a fixed resistor 42 in series with a variable resistor 43. The rate of charge of these capacitors is dependent on the resistance in their charging path and therefore is controlled by the resistor settings. A dial key 44 is used to select either of two sets of limits, one for one type of dial, and the other for another type dial. In addition, an adjust-inspect key 46 is used to change the limits by a small amount. With the key in the inspect position, the maximum and minimum speeds are rigidly set. With the key 46 in the adjust position, the limits are slightly inside the rigid limits. This system is used so that after a dial is adjusted, a slight change in its speed or percent break (a dial does not run at exactly the same speed every time) will still allow the dial to be classified as good when it is inspected later.

Relays 35 and 47 are gating relays which control the length of time for which the capacitors are charged. In their normal positions (before dialing) relay 35 normally open contacts and the relay 47 normally closed contacts open the various charging circuits. On the first dial break, relay 33 of the relay driver circuit operates as previously explained and its normally open contact completes a path through the winding of relay 35 from −48 v. D.C. to ground. The operation of relay 35, on the first brake, releases the normally operated relay 47 as a result of contact 2 of relay 35 opening the path of relay 47 from −48 v. D.C. to ground. Therefore, at the first break, the capacitors start to charge through the operated contacts 10 and 12 of relay 35 and the normally closed contacts 10 and 12 of relay 47.

Relays 35 and 47 have contact protectors 48 and 49, respectively, connected across their windings. These are used to absorb any pulses which the relays might radiate when they release and which might falsely trigger the thyratrons.

At the tenth break of the dial contacts, driver relay 33 releases and opens the ground path of relay 35, releasing it also. The release of relay 35 completes the path through relay 47 to ground and then relay 47 operates. Relays 35 and 47 do not change state simultaneously, but instead, relay 35 releases and a very short time later relay 47 operates. The instant relay 35 releases, the capacitors of the voltage comparison circuits 30, 30′ and relay contacts of relays 35 and 47 are exactly as shown in the drawing. All relay contacts in the drawing are shown as they would be if the test set power was turned off.

Each pair of capacitors 37, 38, 37′, 38′ are connected in series but opposing each other; the top of capacitor 38 is positive, whereas the bottom of capacitor 37 is positive. The upper capacitor 38 is connected to the input of amplifier 50, through contact 12 of relay 47, contact 12 of relay 35, while the lower capacitor 37 is connected to ground through contact 10 of relay 35. As a result, the difference of the two capacitor voltages will be applied to the input of amplifier 50, comprising tubes 50–1 and 50–2. The dial testing circuit is so calibrated that if the dial speed is exactly equal to the limit, the final charge on the upper capacitor will be 2 volts greater than the charge on the lower capacitor and the result is a two-volt positive pulse being applied to the amplifier input. A moment later, relay 47 operates and removes the capacitors from the amplifiers and then discharges them through their associated 2.2K resistors 52. Capacitor 38, for instance, is discharged through contact 12 of relay 47 and resistor 52 while capacitor 37 discharges through contact 10 of relay 47 and resistor 52. This discharging of the capacitors automatically resets the voltage comparison capacitors. The positive side of each capacitor is connected to a test jack 53–1 to 53–8 to facilitate measuring the capacitor voltages if trouble shooting of this circuit is required. A dial is out of limits if any of the upper capacitors of a pair has a voltage more than two volts greater than its lower capacitor voltage. With this arrangement, if something happened to the 150 v. supply, such as burning out, etc., none of the capacitors would receive a charge, and therefore, the charge on upper capacitors would not be greater than on the lower, and all dials would test good for speed. To prevent the operator from accepting these dials, capacitors 38 and 38′ are charged from a second source 54, but only if something is wrong with the 150 v. supply. A voltage of 325 v. D.C. is applied to the series combination of 56 and 57 and results in a voltage of 81 v. at the junction of these resistors and the top of varistor 58. A voltage of 150 v. D.C. applied to resistors 39 and 59 results in a voltage of 94 v. at the junction of these resistors and the bottom of varistor 58. If both of these voltages are applied to varistor 58, no current will flow through, as it will conduct only if the back is more positive than the front, and therefore the varistor path will not affect the capacitors. If, however, the 150 v. supply is not working, the 94 v. will not be applied to the varistor and now the varistor 58 will conduct and charge capacitor 38, 38′. Upper capacitor 38 will then have a greater voltage than its lower one which would not receive any charge, and therefore the dials will now show fast on the speed test.

If the pulse fed to the input grid of amplifier 50 is a two-volt positive pulse, it will be amplified and result in a 100-volt positive output pulse at output terminal 61. The two-volt input pulse causes the tube 50–1 to conduct more, resulting in a drop in its plate voltage. The negative pulse from the plate is then coupled to the grid of the tube 50–2 causing it to conduct less, and resulting in an increase in its plate voltage. The output pulse is then due to a momentary change in this plate voltage from 20 v. to 120 v., which appears on the left of varistor 62. The right side of varistor 62 is normally at a potention of 100 v. because of the 325 v. applied across the voltage dividing resistors 63, 64 at the input of thyratron 65 in the thyratron trigger unit 70. Therefore, only that portion of the output pulse which is greater than 100 v. above ground will be coupled through varistor 62. As a result, the 120 v. pulse at the left of the varistor will appear as a 20 v. pulse on the right, and this pulse in turn is coupled to the grid of thyratron 65. This 20 v. pulse is then just sufficent to overcome the −24 v. grid bias and cause the thyratron 65 to fire. A two-volt pulse was chosen as the capacitor voltage difference to be obtained when exactly on the limit, to eliminate response to stray low-level voltages. To further eliminate the effect of radiated pulses, the amplifier input has a high frequency filter capacitor 75.

When the thyratron 65 fires, the indicator relay 66 in its plate circuit will operate. Once relay 66 operates, the lower side of its winding is connected through contact 10 of relay 66 and contact 8 of relay 35 to ground. This grounds the thyratron plate and extinguishes it, yet the relay is held operated through its own contact. If relay 66 operates, the fast lamp F will light as the result of −48 v. D.C. being applied through contact 8 of relay 66, the fast lamp F, contact 4 of reset relay 67 (which, for the moment, we accept as being closed), and contact 2 of relay 47 to ground. Likewise, if the dial were slow, relay 66' would operate and the slow lamp S would light. If the dial is good, neither relay 66 nor relay 66' will operate, and the good lamp G will light through contact 2 of relay 66', contact 9 of relay 66, at the end of the tenth pulse when contact 2 of relay 47 closes the common side of the dial lamp circuit. If the dial is operated again, at the first break contact 2 of relay 47 will open and extinguish the indicator lamps, while contact 8 of relay 35 will open and release the indicator relays. Amplifier 50' corresponds to amplifier 50, while thyratron trigger 70' corresponds to thyratron trigger 70.

The initial dial input pulses were also fed to the grid of thyratron 71 in the percent break charging circuit. Tube 72 is identical to tube 71. On the first dial break, a positive 24 v. pulse (−24 to 0 v.) is applied simultaneously to the grid of thyratron 71 and to the tube 73 through C1. This pulse overcomes the grid bias on the tubes and both tubes then conduct. As the two tubes are in series, they are always either both on or both off. The cathode of tube 73 is biased at approximately −40 v. because of the voltage divider which consists of R1 and R2. Therefore, the potential across both tubes is 365 v. (325 v. to −40 v.). When both tubes conduct, they have a voltage drop across them of approximately 40 v. which leaves the plate voltage of tube 71 at 0 volts. On the first make of the dial contacts, a negative pulse (0 v. to −24 v.) is fed to tube 71 and tube 73. This pulse has no direct effect on tube 71 (once a thyratron fires its grid has no control over the tube) but it does cut off tube 73, which stops conducting and in turn extinguishes tube 71 by opening its cathode circuit. When this occurs, the plate voltage of tube 71 increases and a positive pulse is coupled through C1 to tube 72 and tube 74, causing them both to conduct in a similar manner as above. The plate voltages of tube 71 and 72 are used to charge the percent break capacitors 76, 77, 76', 77'. The plate voltage of tube 72 charges capacitors 76 and 76' during the break portions of the dial pulses, at which time tube 72 is off and has a plate voltage of 325 v. while tube 71 is on and has a zero plate voltage. The plate voltage of tube 71 charges the reference capacitors 77 and 77' during the make portions of the dial pulses, at which time tube 71 is off and has a plate voltage of 325 v. while tube 72 is on and has a zero plate voltage. The reference capacitors 77 and 77' are always charged alike as they are both charged through the fixed resistor 78. The circuit is calibrated just as the speed circuit is calibrated so that when the percent break is exactly equal to one of the limits, the upper capacitor 76 of the pair associated with this limit will be charged two volts greater than the lower capacitor. The circuit to the right of the capacitors is identical to the speed circuit except for the common side of the percent break indicator lamps.

The right side of each of the high, good, and low lamps is connected to a normally open contact on the dial key 44, and only when this key is in the lower dial position will the lamps be connected to ground through contact 4 of relay 67 and contact 2 of relay 47. Therefore, no matter what type of dial is tested, the circuit will measure percent break, but only in the lower key position will the lamps light and indicate the result of the test. This arrangement is used because there is no percent break requirement on other type dials wherein the upper key position is used. One other difference in the percent break circuit is the use of three varistors 81, 82 and 83 in the charging paths. In the speed circuit, the capacitors were continuously being charged from the dial count of one to ten, whereas in the percent break, each capacitor receives a series of charging pulses. For example, capacitor 76 is charged during the first break, but at the first make its charging voltage drops to zero. Capacitor 76 would then discharged through tube 72, if it were not for varistor 81 which will pass current through it only in the forward direction. Therefore, the three varistors are used to prevent the capacitors from discharging between charging pulses.

The dial circuit is automatically reset, allowing the operator to spin the dial as many times as he likes without having to reset the circuit manually as long as he dials ten pulses every time. On the very first break of the dial, after stepping the selector switch 20 into position, the reset relay 67 will operate as the result of −48 v. D.C. being applied through contact 9 of relay 21, and contact 2 of relay 47 (which closes on the first break) to ground. When relay 67 operates, its winding is then connected through its contact 5 and the normally closed reset-switch contact 86 to ground. Once relay 67 is operated, it will stay this way no matter how many times the tester dials, and will only release when the reset switch 86 is pushed or the tester steps out of the testing position by operation of selector switch 20. When the operator steps out of the testing position and later steps back into the dial test position, the circuit is also automatically reset as follows: Stepping out of the testing position releases relay 21 and 67 and then contact 12 of relay 21 removes the plate voltage from the counter tube 27, pulse amplifier 26, tubes 34 and 36, while contact 4 of relay 67 extinguishes the indicator lamps. The plate voltage is removed from these tubes to prevent their being operated when stepping in and out of the dial test position. While out of the dial position, the counter tube reset capacitor 87 charges up to 325 v. D.C. through resistors 88 and 89 with the left side of the capacitor 87 being negative. Upon stepping back into the testing position, relay 21 operates, restoring plate voltage to the tubes. At the same time, the right side of capacitor 87 is grounded through contact 3 of relay 67, and contact 8 of relay 21. Since the left side of capacitor 87 was negative when the capacitor was charged to 325 v. D.C., its potential momentarily drops to −325 v. with respect to ground when the right side is grounded. This drop results in a −325 v. pulse being applied to the counter tube normal cathode (not shown) and resets the tube. The ground is removed from capacitor 87 when relay 67 operates on the first break, and the capacitor will then begin charging again.

The only other time the circuit must be reset is when some digit other than ten is dialed. In this case the illuminated reset switch 86 is operated. This releases relay 67 which resets tubes 34 and 36 by removing ground from their cathodes and releases relay 33 which resets relays 35, 47, etc. In addition, when relay 67 releases, it resets the counter tube as just described.

The voltage at terminal 24 is −24 v. D.C. when the dial contact is closed, and zero volts when the dial contact is open, the zero votls being due to the low forward resistance of the diode connected from the input pulse amplifier input to ground. If, however, this diode were to burn out or a wire to it becomes disconnected, the voltage at terminal 24 would be 325 v. D.C. instead of zero. This voltage would then constitute a hazard to the operator of the test set. To make the operator aware of this defect if it ever should occur, this terminal 24 voltage is also applied through another diode to a neon lamp 90. This neon is called the fuse lamp and will light, indicating trouble, if the input pulse amplifier input diode fails.

Various changes may be made without departing from the spirit of the invention.

What is claimed is:

1. A testing circuit for testing the time duration of a series of generated pulses comprising:
 a pair of capacitance circuits connected in series opposition,
 a charging circuit means including a pair of resistance circuits,
 means responsive to a first pulse for connecting the charging circuit means to the capacitance circuits to charge the capacitance circuits at rates dependent upon the values of the resistance circuits,
 normally unoperated means for indicating a predetermined difference in charge on the capacitance circuits, and
 means responsive to a predetermined succeeding pulse for disconnecting the charging circuit means from the capacitance circuits and for operating the indicating means when the predetermined difference in charge exists in the capacitance circuits.

2. A circuit for testing the speed of operation of a telephone dial comprising:
 means responsive to the operation of the telephone dial for generating pulses,
 a first capacitor circuit means having a first charging rate,
 a second capacitor circuit means having a second charging rate,
 a charging circuit,
 a first switching circuit means for connecting the charging circuit to the first and second capacitor circuit means,
 means responsive to the first dial pulse for operating the first switching circuit means,
 an amplifier,
 means for biasing the amplifier against response to voltages below a predetermined level,
 a second switching circuit means connecting the first and second capacitor circuit means to apply the difference in voltage charge on the first and second capacitor circuit means to the amplifier whereupon a predetermined level of difference in voltage operates the amplifier,
 means responsive to a predetermined succeeding pulse for interrupting operation of the first switching circuit means and for operating the second circuit switching means, and
 an indicating means connected to and operated by the operation of the amplifier.

3. A circuit for testing the speed of operation of a pulsing relay which operates to produce a train of pulses,
 a first capacitor circuit means having a first predetermined charging rate,
 a second capacitor circuit means having a second predetermined charging rate,
 a main charging circuit,
 a first switching means responsive to a first of the pulses for connecting the main charging circuit to both of said capacitor circuits to accumulate charges on the capacitor circuits,
 an auxiliary charging circuit,
 means interconnecting the auxiliary charging circuit and the capacitor circuits and rendered effective by the failure of the main charging circuit for applying charges from the auxiliary charging circuit to the capacitor circuits,
 an indicator,
 means responsive to a predetermined difference of charges on said capacitor circuits for operating the indicator, and
 a second switching means responsive to a predetermined succeeding pulse for interrupting the charging circuit connected to the capacitor circuit means and connecting the first and second capacitor circuit means to the indicator.

4. A circuit for testing a series of pulses generated by the operation of a pulsing relay,
 a pair of electron devices each including a control electrode,
 a counter tube having a pair of outputs respectively connected to the pair of control electrodes,
 a polarized relay having a pair of opposite windings connected to be individually energized by the respective electron devices,
 means for applying the pulses to step the counter tube to sequentially energize the outputs and operate the electrode devices to successively energize the polarized relay windings,
 a pair of capacitance circuits connected in series opposition,
 a pair of normally disconnected charging circuits having different charging rates,
 means responsive to the energization of the first winding of the polarized relay for connecting both the charging circuits to the capacitance circuits to charge the circuits at different rates,
 normally disconnected means for indicating the difference in charges accumulated on the capacitance circuits,
 means responsive to the energization of the second winding of the polarized relay for interrupting operation of the first electronic device to disconnect the charging circuits, and
 means responsive to the energization of the second winding of the polarized relay for connecting the indicating means to the capacitance circuits.

5. A testing circuit for testing a series of pulses generated by the operation of a pulsing relay comprising:
 a counter circuit having a plurality of energizable outputs,
 means for applying pulses to operate the counter circuit to successively energize the outputs,
 a pair of thyratrons, each including an anode and a control grid,
 means connecting the grid of the first thyratron to a first of the outputs for operating the first thyratron,
 a polarized relay having a pair of opposite windings respectively connected to the anodes of the thyratrons, whereupon the operation of said first thyratron energizes a first winding of the relay,
 means connecting the grid of the second thyratron to a second of the outputs for operating the second thyratron whereupon the operation of the second thyratron energizes the second winding of said relay and simultaneously reduces the voltage in the first winding to interrupt operation of the first thyratron,
 a comparison circuit including a pair of capacitance circuits connected in series opposition and a pair of normally disconnected different charging circuits,
 a first switching circuit means energized by energization of the first winding of the relay for connecting the charging circuits to the capacitance circuits,
 an indicator circuit including contacts normally disconnected from the capacitance circuits for reading a difference in charge on the capacitance circuits, and
 a second switching circuit means operated by energization of the second relay winding for sequentially deenergizing the first switching circuit means and then closing the indicator circuit contacts to connect the capacitance circuits to the indicator circuit.

6. A test circuit for testing the make-break time of a train of pulses generated by a pulsing relay,
 a pair of capacitance circuits connected in series opposition,
 a pair of charging circuits each having a different charging rate,
 means responsive to a first of the pulses for connecting the charging circuits to the capacitance circuits, a pair of thyratron circuits each of which include an electron tube in its cathode circuit and an anode in one of the charging circuits, means for applying the pulses to a first of the electron tubes to operate the associated thyratron to successively interrupt the charging circuit to a first of the capacitance circuits, means connected to the anode of the first thyratron and responsive to the interruption of operation of the first thyratron for successively operating the second electron tube and second thyratron to successively interrupt the charging circuit connected to the second capacitance circuit, means responsive to a predetermined succeeding pulse for disconnecting the charging circuits from the capacitance circuits, normally disconnected means for indicating a predetermined difference in charge on the capacitance circuits, and means responsive to the predetermined succeeding pulse for connecting the indicating means to the capacitance circuits.

References Cited in the file of this patent

UNITED STATES PATENTS

| | | |
|---|---|---|
| 1,759,837 | Brown et al. | May 27, 1930 |
| 2,268,222 | Peterson | Dec. 30, 1941 |
| 2,416,102 | Kessler et al. | Feb. 18, 1947 |
| 2,428,488 | Ghormley | Oct. 7, 1947 |
| 2,804,604 | Warman | Aug. 27, 1957 |
| 2,826,648 | Kessler | Mar. 11, 1958 |
| 2,857,484 | Culbertson | Oct. 21, 1958 |